J. F. COURSON.
DRAFT GEAR.
APPLICATION FILED JAN. 19, 1915.
1,149,733.
Patented Aug. 10, 1915.
2 SHEETS—SHEET 1.
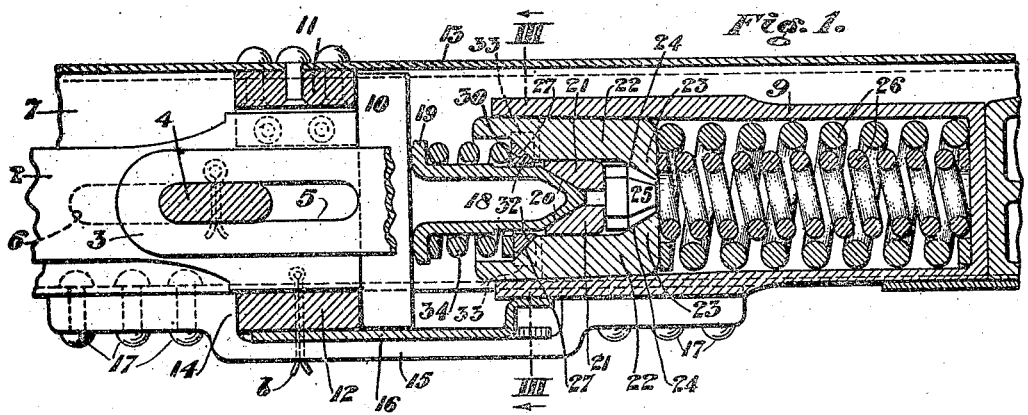
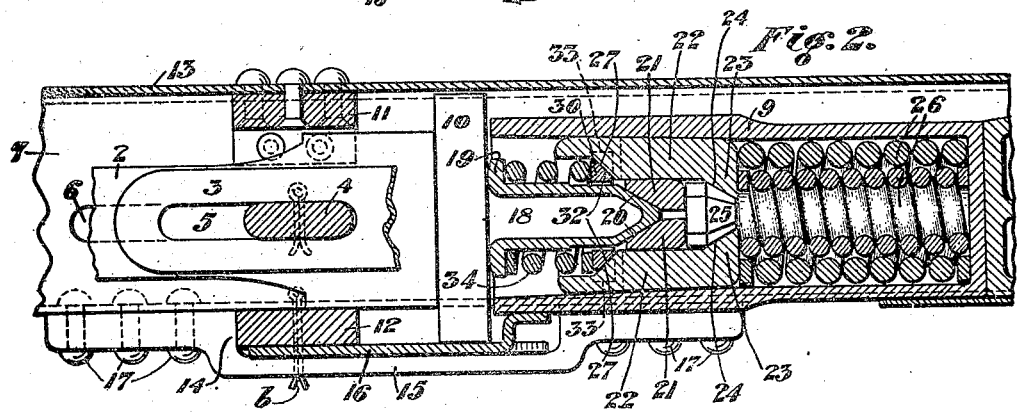
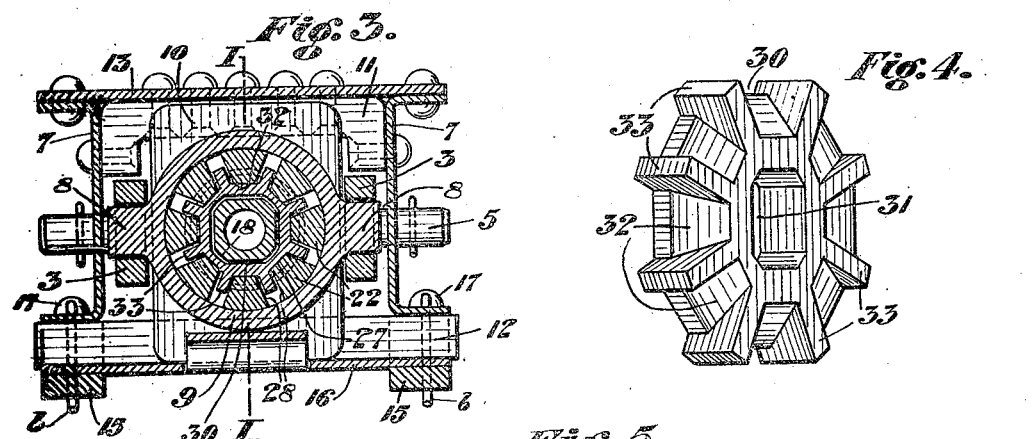
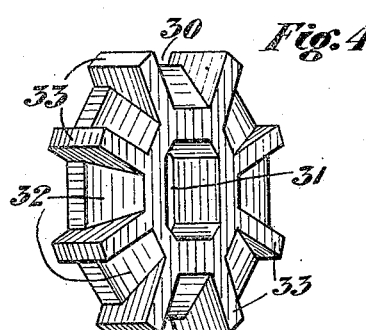
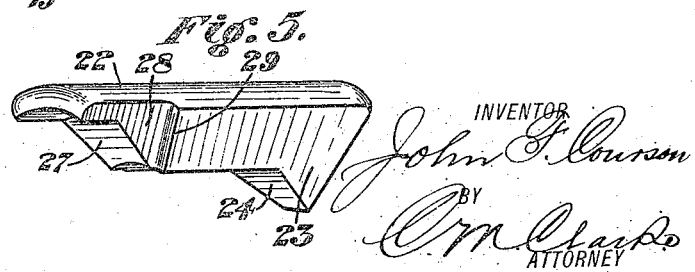
WITNESSES:
INVENTOR
John F. Courson
BY
ATTORNEY J. F. COURSON.
DRAFT GEAR.
APPLICATION FILED JAN. 19, 1915.
1,149,733.
Patented Aug. 10, 1915.
2 SHEETS—SHEET 2.
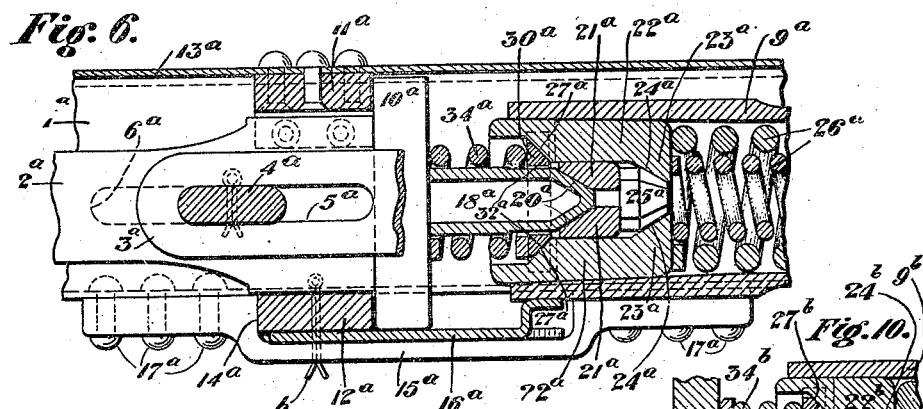
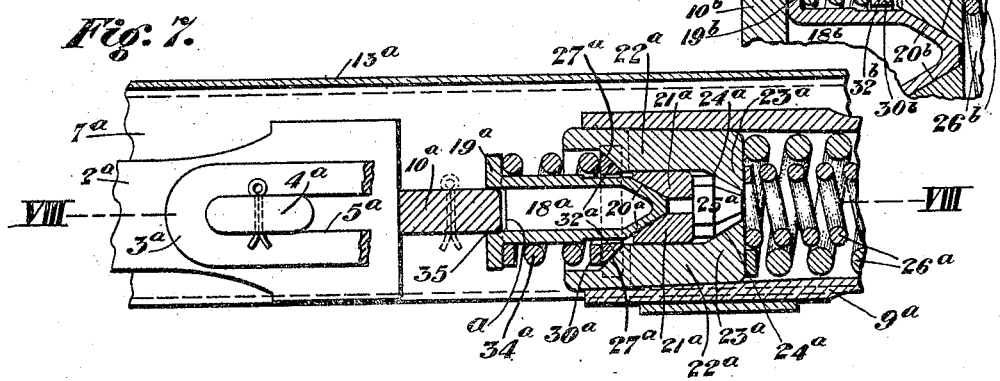
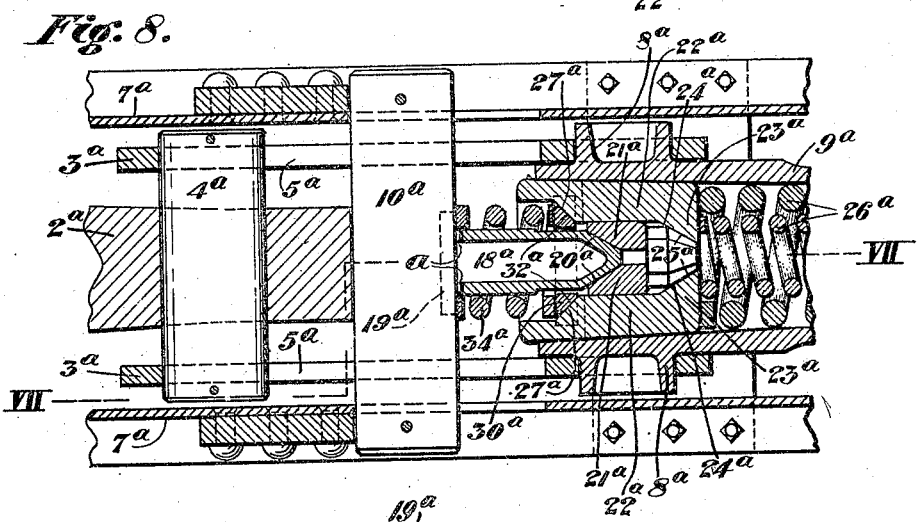
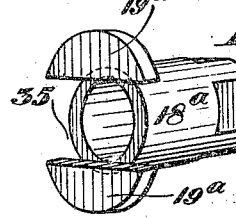
Witnesses:
Edwin Trueb
Iva Lechman
Inventor:
John F. Courson
by O. M. Clarke
his Attorney

UNITED STATES PATENT OFFICE.

JOHN F. COURSON, OF PITCAIRN, PENNSYLVANIA.

DRAFT-GEAR.

1,149,733.  Specification of Letters Patent.  Patented Aug. 10, 1915.

Application filed January 19, 1915. Serial No. 3,080.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in draft gears of the class using springs and friction shoes in connection with centrally arranged expanding wedge mechanism operable upon buffing or pulling to effect expansion of the friction shoes within an embracing cylinder or casing.
The particular object in view is to provide in a gear of this type means for effecting the resumption of the parts to normal position, the maintenance of the parts in a free, open relaxed condition, and means for positioning the parts and for compensating for wear or resulting lost motion.

In the construction as herein presented, the specific application of the invention is in connection with the central expanding wedge or pressure bar, and a spring therewith associated, with a centralizing expanding and positioning wedge device in co-acting engagement with the friction shoes.

The objects in view are accomplished, in certain preferred forms of the apparatus, more fully hereinafter described, as illustrated in the accompanying drawings, in which—

Figure 1 is a longitudinal vertical sectional view through the complete gear as assembled, the parts being shown in extended position, as indicated by the section line I. I. of Fig. 3. Fig. 2 is a similar sectional view, showing the gear compressed.
Fig. 3 is a transverse sectional view, indicated by the line III. III. of Fig. 1. Fig. 4 is a perspective detail view of the expanding collar. Fig. 5 is a similar view of one of the friction shoes. Fig. 6 is a partial longitudinal sectional view, similar to Fig. 1, showing a modified construction of the central expanding wedge. Fig. 7 is a similar view, showing a further modified arrangement, utilizing a follower extending through the car framing, indicated by the section line VII. VII. of Fig. 8. Fig. 8 is a horizontal sectional view of the same construction, indicated by the section line VIII. VIII. of Fig. 7. Fig. 9 is a detail perspective view of the central expanding wedge as used with the above modified constructions. Fig. 10 is a sectional detail view showing a modified construction.

In the drawings, 2 represents the drawbar of a coupler connected with the bars or links 3 by a transverse bolt or key 4, which extends through slots 5 in the front portion of links 3, and through slots 6 in the center sills 7 of the car framing at each side. Links 3 extend rearwardly and engage lugs 8 of the casing 9 at each side between the center sills.

A follower 10, vertically arranged in the constructions of Figs. 1 to 6 inclusive, bears forwardly against front stops 11, 12, secured in the upper and lower portions of the car framing respectively, as shown. Stop 11 is permanent and secured by rivets, as shown, to the center sills and cover plate 13, while stop 12 is laid along underneath the edge of the sills and bears forwardly against shoulder 14 of a supporting bracket 15, which is secured up underneath the lower edge of the sills at each side. Said bracket is provided with a sliding plate 16, upon which follower 10 may slide, and such construction provides for the easy removal of all of the working parts of the gear by merely removing the cotters *b*, which hold the key 10 and plate 16 in position.

A central wedge block or buffing pressure bar 18 bears directly against the rear central portion of follower 10 by its flange end 19, and said wedge block is provided with angularly disposed wedge faces 20 of pyramidal or other suitable arrangement, corresponding in number and degree of slope to the inner faces of expanding wedges 21, said faces tapering inwardly toward the center at such an angle toward the horizontal as to produce a maximum expansion with resulting free release.

Wedges or wedge blocks 21 bear outwardly against the inner faces of a plurality of friction shoes 22 arranged in an annular series within the casing 9 and adapted to frictionally engage the inner, preferably tapered, surface thereof. Said shoes are provided at their inner ends with inwardly disposed rear terminals 23 having inner wedge faces 24, against which bear the faces of a rear expanding wedge 25.

Main springs 26 are inserted within the rear end of the casing 9, bearing against the rear inner end thereof, and against the rear ends of shoes 22 respectively, in a well-known manner.

Each of the segmental-shaped friction shoes 22 is provided at its front portion with a wedging surface 27 across the inner face of the shoe and between the radial faces 28, which define a narrower front extension of the shoes beyond the shoulders 29 at each side, back of which the main body portions of the shoes are practically in contacting engagement with each other, with slight clearance.

The purpose of so providing wedge faces 27 and the narrowed front extension of the shoe in the same region is to provide for the insertion of the expanding collar 30 (see Fig. 4).

Said collar, as shown, is provided with a central opening 31, by which it fits around or over the central wedge 18, and is provided with alternating wedge faces 32 and dividing separating projections 33. When in position, faces 32 make contacting engagement with face 27 of the friction shoes, and extensions 33 fit between and definitely space apart the front portions of the shoes, as is clearly shown in Fig. 3.

Inserted between the front face of expanding collar 30 and the rear face of flange 19 of the central wedge 18 is a retracting spring 34, the purpose of which is to thrust the central wedge outwardly upon release of pressure in either buffing or pulling, whereby to effectively release it and permit the several parts to resume their normal inoperative position. Central wedge 18 is of the "floating" type, being unconnected with and free of restraint by any connection with the rear portion of the gear.

In normal position, as shown in Fig. 1, spring or springs 26 being expanded upon release of the gear, spring 34 operates to thrust the central wedge 18 outwardly, carrying follower 10 before it; at the same time releasing the parts from binding strain. Upon closing of the gear in pulling, the casing 9 will be drawn with its contents forwardly against the central wedge 18 resisted by follower 10, effecting expansion of the friction-creating mechanism; while in buffing, rearward movement of drawbar 2 thrusts wedge 18 inwardly by follower 10, effecting the same result. In either case, spring 34 will effect inward pressure against collar 30, providing a certain initial wedging expansion of the front portions of the shoes, and in all cases the resilience of spring 34, which is normally always under some compression, will keep collar 30 tightly seated against the various wedging faces 27 so as to maintain the shoes always in operative position with relation to the casing. At the same time, the spacing extensions 33 will maintain the shoes in proper annular relationship.

In the construction shown on the second sheet of the drawings, Figs. 6 to 9 inclusive, the arrangement of the parts is substantially the same as above described, and identified by corresponding numerals with the exponent "a." In such constructions, however, the central wedge 18$^a$ either bears directly against the follower, as does the spring, or the wedge is provided with the flange 19$^a$ at each side of an intervening recess 35 (see Fig. 9), thereby permitting the front end of spring 34$^a$ to abut directly against the rear face of flanges 19$^a$. A slight clearance $a$ may be provided, as indicated in Figs. 7 and 8 to insure avoidance of any lack of free operation of the spring, thereby insuring its positive engagement against the follower, while at the same time positively engaging the flanges 19$^a$ to retract the wedge. In such construction, the pressure is transmitted directly between the rear edge of follower 10$^a$ and the front edges of the central wedge 18$^a$, due to the clearance provided by omitting the flange, thus insuring direct transmission of the strains either in buffing or pulling.

In Fig. 10, I show the simplest arrangement of the several constructions, the central wedge engaging directly against the friction shoes. The construction, arrangement and operation of the gear is otherwise the same as has been above described.

The invention will be readily understood from the foregoing description. It greatly facilitates the action of the gear in insuring constant maintenance of the desired relative arrangement of the co-acting parts, compensating for any lost motion or wear of the shoes with relation to the inner surface of the casing. Should any such wear become excessive, it may be furthermore compensated by merely inserting a thin disk or liner between the rear ends of springs 26 and the inner end of the cylinder.

The construction facilitates the action of the gear in releasing and in maintenance of the relative position of the parts, thereby providing for prompt accurate action and full development of its efficiency.

The invention may be changed or modified in construction or detail arrangement by the skilled mechanic, but all such changes are to be considered as within the scope of the following claims.

What I claim is:

1. In a friction draft gear embodying a casing, friction shoes therein, and a centrally disposed expanding wedge, the combination therewith of an expanding and lateral spacing collar engaging the friction shoes, and a spring adapted to exert inward pressure on said collar.

2. In a friction draft gear embodying a casing, friction shoes therein having expanding wedge faces, and a centrally disposed expanding wedge, the combination therewith of an expanding and lateral spacing collar having wedge faces engaging the wedge faces of the shoes, and a spring adapted to exert inward pressure on said collar.

3. In a friction draft gear embodying a casing, friction shoes therein having expanding wedge faces, and a centrally disposed expanding wedge, the combination therewith of an expanding collar having wedge faces engaging the wedge faces of the shoes and lateral spacing projections extending between the shoes, and a spring adapted to exert inward pressure on said collar.

4. In a draft gear, the combination of a casing, friction shoes therein, a central expanding wedge, a drawbar, a wedging and lateral spacing collar engaging the friction shoes, and a spring inserted between said collar and the drawbar.

5. In a draft gear, the combination of a casing, friction shoes therein, a central expanding wedge, a drawbar, a wedging collar having wedge faces and spacing projections engaging the friction shoes, and a spring inserted between said collar and the drawbar.

6. In a draft gear, the combination of a casing, friction shoes therein having outer projecting portions and wedge faces inwardly thereof, a central expanding wedge, a drawbar, means connecting the casing and drawbar, a wedging collar engaging the wedge faces of the friction shoes inwardly beyond said projecting portions, and a spring inserted between said collar and the drawbar.

7. In a draft gear, the combination of a casing, friction shoes therein, a central expanding wedge, a drawbar, a follower, a wedging collar engaging the friction shoes independent of the casing and a spring inserted between said collar and the follower.

8. In a draft bar, the combination of a casing, friction shoes therein, a central expanding wedge, a drawbar, a follower, a wedging and spacing collar engaging the friction shoes, and a spring surrounding the expanding wedge between said collar and the follower and directly engaging the latter.

9. In a draft gear, the combination of a casing, friction shoes therein, a central expanding wedge having at its forward end a central directly abutting portion and lateral follower-embracing portions extending forwardly of said abutting portion and providing intervening clearance openings, a drawbar, a follower engaging the expanding wedge between said embracing portions, a wedging collar engaging the friction shoes, and a spring surrounding the expanding wedge between said collar and the follower and directly engaging the latter at said clearance openings.

10. In a draft gear, the combination of a casing, friction shoes therein having inner wedge faces, a central expanding wedge, a co-acting rear expanding wedge engaging said faces, a drawbar, a follower, a wedging collar surrounding the central wedge and engaging the friction shoes, and a spring inserted between said collar and the follower.

11. In a draft gear, the combination of a casing, friction shoes therein having inner wedge faces, a central expanding wedge, a co-acting rear expanding wedge engaging said faces, a drawbar, a follower, a wedging collar surrounding the central wedge and engaging the friction shoes, and a spring bearing by one end against said collar and by the other end against the central expanding wedge.

12. In a friction draft gear, the combination of a casing, friction shoes therein having expanding wedge faces at their front ends, a centrally disposed expanding wedge adapted to force the friction shoes laterally against the casing, an expanding collar having wedge faces engaging the wedge faces at the front ends of the friction shoes, and a spring adapted to exert inward pressure on said collar and to move it with the friction shoes within the casing.

13. In a draft gear, the combination of a casing, friction shoes therein having wedge faces, a central expanding wedge, a drawbar and means operatively connecting it with the casing for transmission of buffing and pulling strains, a wedging collar within the friction shoes and engaging the wedge faces thereof, and a spring engaging the expanding wedge and said collar and adapted to move inwardly of the friction shoes therewith.

In testimony whereof I hereunto affix my signature in the presence of two witnesses.

JOHN F. COURSON.

Witnesses:
A. B. McBRIDE,
O. M. CLARKE.

It is hereby certified that in Letters Patent No 1,149,733, granted August 10, 1915, upon the application of John F. Courson, of Pitcairn, Pennsylvania, for an improvement in "Draft-Gears," errors appear in the printed specification requiring correction as follows: Page 3, line 42, claim 8, for the word "bar" read *gear;* same page, name of second-mentioned witness to signature of patentee, for "O. M. Clarke" read *C. M. Clarke;* and that the said Letters Patent should be read with these corrections therein that the same may conform to the record of the case in the Patent Office.

Signed and sealed this 14th day of December, A. D., 1915.

[SEAL.]

R. F. WHITEHEAD,
*Acting Commissioner of Patents*

Cl. 213—64.